United States Patent
Cho et al.

(10) Patent No.: US 9,601,765 B2
(45) Date of Patent: Mar. 21, 2017

(54) POSITIVE ACTIVE MATERIAL, PREPARING METHOD THEREOF, POSITIVE ELECTRODE FOR LITHIUM SECONDARY BATTERY INCLUDING THE SAME, AND LITHIUM SECONDARY BATTERY EMPLOYING THE SAME

(71) Applicant: Samsung SDI Co., Ltd., Yongin-si, Gyeonggi-do (KR)

(72) Inventors: Sang-Woo Cho, Yongin-si (KR); Yong-Chan You, Yongin-si (KR); Chang-Wook Kim, Yongin-si (KR); Sang-In Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 8 days.

(21) Appl. No.: 14/610,804

(22) Filed: Jan. 30, 2015

(65) Prior Publication Data

US 2015/0243971 A1    Aug. 27, 2015

(30) Foreign Application Priority Data

Feb. 25, 2014    (KR) .................. 10-2014-0022182

(51) Int. Cl.
| | |
|---|---|
| *H01M 10/052* | (2010.01) |
| *H01M 4/36* | (2006.01) |
| *H01M 4/525* | (2010.01) |
| *H01M 4/131* | (2010.01) |
| *H01M 4/1391* | (2010.01) |
| *H01M 4/04* | (2006.01) |
| *H01M 4/505* | (2010.01) |

(Continued)

(52) U.S. Cl.
CPC ......... *H01M 4/366* (2013.01); *H01M 4/0471* (2013.01); *H01M 4/131* (2013.01); *H01M 4/1391* (2013.01); *H01M 4/505* (2013.01); *H01M 4/525* (2013.01); *H01M 4/628* (2013.01); *H01M 10/052* (2013.01); *H01M 2004/028* (2013.01); *Y02E 60/122* (2013.01); *Y02P 70/54* (2015.11); *Y02T 10/7011* (2013.01)

(58) Field of Classification Search
CPC ....... H01M 4/525; H01M 4/505; H01M 4/362
See application file for complete search history.

(56) References Cited

U.S. PATENT DOCUMENTS

| | | | |
|---|---|---|---|
| 6,835,492 B2 | 12/2004 | Cho et al. | |
| 2009/0104532 A1 | 4/2009 | Hosoya | |

(Continued)

FOREIGN PATENT DOCUMENTS

| | | | |
|---|---|---|---|
| JP | 2009-104805 A | 5/2009 | |
| KR | 10-2002-0091748 A | 12/2002 | |

(Continued)

*Primary Examiner* — Stewart Fraser
*Assistant Examiner* — Olatunji Godo
(74) *Attorney, Agent, or Firm* — Knobbe Martens Olson & Bear LLP (57) ABSTRACT

Provided are a positive active material that has a decreased amount of Li-containing impurities that remain on a lithium transition metal composite oxide surface to decrease an amount of gas generation and has improved lifespan properties, a method of preparing the same, a positive electrode for a lithium secondary battery including the positive active material, and a lithium secondary battery including the same.

15 Claims, 5 Drawing Sheets

(51) Int. Cl.
*H01M 4/62* (2006.01)
*H01M 4/02* (2006.01)

(56) References Cited

U.S. PATENT DOCUMENTS

| | | | |
|---|---|---|---|
| 2011/0111298 A1* | 5/2011 | Lopez | H01M 4/131 429/221 |
| 2012/0261610 A1* | 10/2012 | Paulsen | H01M 4/131 252/182.1 |
| 2014/0212759 A1* | 7/2014 | Blangero | C01G 51/42 429/231.3 |

FOREIGN PATENT DOCUMENTS

| | | |
|---|---|---|
| KR | 10-2007-0117826 A | 12/2007 |
| KR | 10-2007-0117827 A | 12/2007 |
| KR | 10-2010-0042145 A | 4/2010 |
| WO | WO2012171780 A1 * | 12/2012 |

* cited by examiner

POSITIVE ACTIVE MATERIAL, PREPARING METHOD THEREOF, POSITIVE ELECTRODE FOR LITHIUM SECONDARY BATTERY INCLUDING THE SAME, AND LITHIUM SECONDARY BATTERY EMPLOYING THE SAME

CROSS-REFERENCE TO RELATED APPLICATION

This application claims the benefit of Korean Patent Application No. 10-2014-0022182, filed on Feb. 25, 2014, in the Korean Intellectual Property Office, the disclosure of which is incorporated herein in its entirety by reference.

BACKGROUND OF THE INVENTION

Field of the Invention

One or more embodiments relate to a positive active material, a method of preparing the same, a positive electrode for a lithium secondary battery including the positive active material, and a lithium secondary battery including the same, and more particularly to a positive active material that has a decreased amount of Li-containing impurities that remain on a surface of a lithium transition metal composite oxide to decrease an amount of gas generation and has improved lifespan properties, a method of preparing the same, a positive electrode for a lithium secondary battery including the positive active material, and a lithium secondary battery including the same.

Description of the Related Art

Lithium secondary batteries used in mobile electronic devices for information communication, such as personal digital assistants (PDAs), mobile phones, and notebook computers, or in electric bicycles and electric vehicles have discharge voltages that are at least twice as high as conventional batteries, and thus, the lithium secondary batteries have large energy densities.

The lithium secondary batteries produce electrical energy through a redox reaction that occurs when lithium ions are intercalated and de-intercalated from a positive electrode and a negative electrode, and an organic electrolyte or a polymer electrolyte is charged between the positive electrode and the negative electrode including active materials that are capable of intercalation and de-intercalation of lithium ions.

The positive active materials of the lithium secondary batteries include lithium transition metal composite oxides including a transition metal and a lithium having a structure capable of intercalation of lithium ions, and examples of the positive active materials include lithium cobalt oxide (LiCoO$_2$), lithium nickel oxide (LiNiO$_2$), or lithium nickel cobalt manganese oxide (for example, Li[NiCoMn]O$_2$, Li[Ni$_{1-x-y}$Co$_x$M$_y$]O$_2$).

However, the lithium transition metal composite oxide gradually has a decreasing calcination temperature as increasing in an amount of nickel in the lithium transition metal composite oxide, such that amounts of Li-containing impurities, such as Li$_2$CO$_3$ and LiOH, increase on a surface of the positive active material, which decomposes during a charge or reacts with an electrolyte to generate gases such as CO$_2$ to deteriorate lifespan properties.

Accordingly, there is a need for decreasing the amounts of Li-containing impurities, such as Li$_2$CO$_3$ and LiOH, that remain on the surface of the positive active material and solving the problem through a simple and cost-effective method.

SUMMARY OF THE INVENTION

One or more embodiments include a positive active material that has a decreased amount of Li-containing impurities that remain on a surface of a lithium transition metal composite oxide to decrease an amount of gas generation and has improved lifespan properties.

One or more embodiments include a positive electrode for a lithium secondary battery including the positive active material.

One or more embodiments include a lithium secondary battery including the positive electrode.

One or more embodiments include a simple method of preparing a positive active material that has a decreased amount of Li-containing impurities that remain on a surface of a lithium transition metal composite oxide to decrease an amount of gas generation and has improved lifespan properties.

Additional aspects will be set forth in part in the description which follows and, in part, will be apparent from the description, or may be learned by practice of the presented embodiments.

According to one or more embodiments of the present invention, a positive active material includes a lithium transition metal composite oxide core; and a coating layer including LiF on at least one portion of a surface of the lithium transition metal composite oxide core, wherein an amount of Li-containing impurities that remain on a surface of a lithium transition metal composite oxide core may be 0.25 parts by weight or less based on 100 parts by weight of the lithium transition metal composite oxide core.

The Li-containing impurities may include lithium carbonate (Li2CO3) and lithium hydroxide (LiOH).

The coating layer may be formed by surface treating the surface of the lithium transition metal composite oxide core with at least one of NH4F, NH4HF2, HF, CF3COOH, and anhydrous hydrogen fluoride.

The coating layer may have LiF particles scattered on the surface of the lithium transition metal composite oxide core.

An amount of the LiF may be about 0.001 parts by weight to about 0.2 parts by weight, based on 100 parts by weight of the lithium transition metal composite oxide core.

A thickness of the coating layer may be about 10 nm to about 500 nm.

An amount of nickel with respect to a total amount of transition metals included in the lithium transition metal composite oxide core may be 40 wt % or greater.

The lithium transition metal composite oxide core may be a lithium transition metal composite oxide represented by Formula 1 below:

<Formula 1> in Formula 1, 0.9<a≤1.1, 0.5≤b<0.9, 0.1≤c<0.45, and 0≤d<0.15, 0.1≤c+d<0.6, M1 is at least one of Co and Mn, and M2 is at least one of Al, Ti, Mg, Sc, V, Cr, Fe, Co, Mn, Zn, B, Si, Ga, Ge, N, P, As, Zr, Mo, W, Ru, Rh, Pt, Ag, and Sn.

The lithium transition metal composite oxide core may be a secondary particle in which a plurality of primary particles are aggregated.

An average diameter (D50) of the secondary particle may be about 3 μm to about 20 μm.

According to other embodiments, provided is a positive electrode for a lithium secondary battery including the positive active material.

According to other embodiments, a lithium secondary battery includes the positive electrode;
a negative electrode; and
an electrolyte disposed between the positive electrode and the negative electrode According to other embodiments, provided is a method of preparing a positive active material, the method including:
preparing a lithium transition metal composite oxide core;
adding the lithium transition metal composite oxide core to a fluoride-based compound solution to obtain a co-precipitation compound; and
heat treating the co-precipitation compound to prepare a coating layer including LiF on at least one portion of a surface of the lithium transition metal composite oxide core.

The fluoride-based compound may be at least one of NH4F, NH4HF2, HF, CF3COOH, and anhydrous hydrogen fluoride.

The fluoride-based compound solution may include water, ether, alcohol, or a combination thereof.

A concentration of the fluoride-based compound solution may be about 0.005 M to about 5 M.

The formation of the coating layer including LiF on at least one portion of the surface of the lithium transition metal composite oxide core may include a heat treatment in air at a temperature of about 300° C. to about 800° C.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE PREFERRED EMBODIMENT

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a positive active material according to an embodiment, a method of preparing the same, a positive electrode for a lithium secondary battery including the positive active material, and a lithium secondary battery including the same are described.

In one embodiment, provided is a positive active material including a lithium transition metal composite oxide core; and a coating layer including LiF on at least one portion of the lithium transition metal composite oxide core, in which an amount of Li-containing impurities that remain on a surface of the lithium transition metal composite oxide core may be 0.25 parts by weight or less based on 100 parts by weight of the lithium transition metal composite oxide core.

The positive active material includes a coating layer including LiF on at least one portion of a surface of the lithium transition metal composite oxide core to prevent a reaction, such as autolysis reaction or electrolyte decomposition reaction of the Li-containing impurities, to thereby decrease generation of gases such as $CO_2$. Also, the amount of Li-containing impurities that remain on a surface of the lithium transition metal composite oxide core may be 0.25 parts by weight or less based on 100 parts by weight of the lithium transition metal composite oxide core to simultaneously decrease the amount of gas generation and maintain high capacity, to thereby improve lifespan properties.

The Li-containing impurities may include lithium carbonate ($Li_2CO_3$) and lithium hydroxide (LiOH), but the Li-containing impurities are not limited thereto and may include unreacted products or side products that are residual materials produced during the preparation of the lithium transition metal composite oxide core.

The coating layer may be formed by surface treating the surface of the lithium transition metal composite oxide core by using at least one of $NH_4F$, $NH_4HF_2$, HF, $CF_3COOH$, and anhydrous hydrogen fluoride. The coating layer may be formed by a reaction between the Li-containing impurities that remain on the surface of the lithium transition metal composite oxide core, in other words, lithium ions included in $Li_2CO_3$ and LiOH, and fluoride ions included in at least one of $NH_4F$, $NH_4HF_2$, HF, $CF_3COOH$, and anhydrous hydrogen fluoride, which are fluoride-based compounds.

However, when a fluoride-based compound, for example, $NH_4F$, is used as a sintering additive, a boiling point of $NH_4F$ is about 65° C., and thus, $NH_4F$ completely evaporates at a temperature of 100° C. or less, reacting $NH_4F$ with lithium ions included in $Li_2CO_3$ and LiOH that remain on the surface of the lithium transition metal composite oxide core, such that the coating layer including LiF may be difficult to form.

The coating layer may have LiF particles scattered on the surface of the lithium transition metal composite oxide core. The coating layer may have LiF scattered on the surface of the lithium transition metal composite oxide core as particles, and thus, high capacity may be maintained and the gas generation may be decreased.

The amount of the LiF may be about 0.001 parts by weight to about 0.2 parts by weight, for example, about 0.01 parts by weight to about 0.15 parts by weight based on 100 parts by weight of the lithium transition metal composite oxide core.

A thickness of the coating layer may be about 10 nm to about 500 nm, for example, about 10 nm to about 100 nm. A lithium secondary battery, including a positive active material that includes a coating layer having a thickness in the range described above, may have improved lifespan properties.

A ratio of the amount of LiF included in the coating layer to the amount of Li-containing impurities that remain on the surface of the lithium transition metal composite oxide core may be about 1:0.002 wt % to about 1:0.5 wt %, for example, about 1:0.005 to about 1:0.4. When the ratio of the amount of LiF included in the coating layer to the amount of Li-containing impurities that remain on the surface of the lithium transition metal composite oxide core is in the range described above, the positive active material may have chemical stability and high capacity, and thus lifespan properties of a lithium secondary battery, including the positive active material, may be improved.

An amount of nickel with respect to a total amount of transition metals included in the lithium transition metal composite oxide core may be 40 wt % or greater.

The lithium transition metal composite oxide core may be a lithium transition metal composite oxide represented by Formula 1:

$$Li_aNi_b(M1)_c(M2)_dO_2 \qquad <\text{Formula 1}>$$

In Formula 1,
$0.9<a\leq1.1$, $0.5\leq b<0.9$, $0.1\leq c<0.45$, $0\leq d<0.15$, $0.1\leq c+d<0.6$, M1 is at least one of Co and Mn, and M2 is at least one of Al, Ti, Mg, Sc, V, Cr, Fe, Co, Mn, Zn, B, Si, Ga, Ge, N, P, As, Zr, Mo, W, Ru, Rh, Pt, Ag, and Sn.

When a positive active material includes a lithium transition metal composite oxide core, which includes a large amount of nickel, 40 wt % or greater based on the total amount of transition metals, a lithium secondary battery including the positive active material may maintain high capacity and decrease gas generation to have chemical stability. Thus, the lithium secondary battery may have a better improved battery performance.

The lithium transition metal composite oxide core may be a secondary particle in which a plurality of primary particles are aggregated.

Because the lithium transition metal composite oxide core includes the secondary particle in which a plurality of primary particles are aggregated, lithium ions may move to a surface of the lithium transition metal composite oxide core and react with moisture or $CO_2$ in the air to generate Li-containing impurities, such as $Li_2CO_3$ and LiOH. However, a coating layer including LiF may be included on at least one portion of the surface of the lithium transition metal composite oxide core to decrease the generation of gas such as $CO_2$.

The average diameter (D50) of the secondary particle may be about 3 μm to about 20 μm, for example, about 5 μm to about 15 μm. When the average diameter (D50) of the secondary particle of the lithium transition metal composite oxide core is in the range described above, a positive active material having high energy density per unit mass, e.g., high capacity, may be obtained.

The average diameter (D50) refers to a cumulative average diameter that corresponds to 50 volume % and 75 volume % in a cumulative distribution curve of particles, in which a total volume thereof is 100%. The average diameter (D50) may be measured by a method widely known to one of ordinary skill in the art, for example, the average diameter (D50) may be measured by a particle size analyzer or from a transmission electron microscope image or a scanning electron microscope image. In another embodiment, the average diameter (D50) may be measured by using a measuring device for dynamic light-scattering and then the data obtained therefrom may be analyzed to count the number of particles in each size range.

In another embodiment, provided is a positive electrode for a lithium secondary battery including the positive active material described above.

In another embodiment, provided is a lithium secondary battery including a positive electrode; a negative electrode; and an electrolyte disposed between the positive electrode and the negative electrode.

Figure 4:
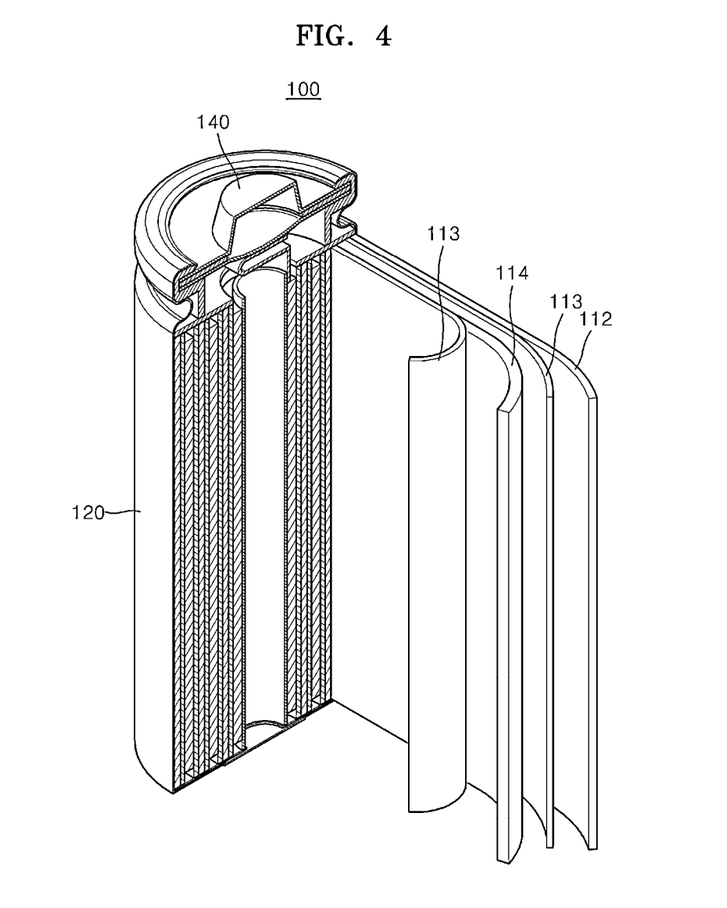
FIG. 4 is an exploded perspective view of a lithium secondary battery according to an embodiment.

FIG. 4 is an exploded perspective view of a lithium secondary battery 100 according to an embodiment. As illustrated in FIG. 4, the lithium secondary battery 100 includes a positive electrode 114, a negative electrode 112, and a separator 113 disposed between the positive electrode 114 and the negative electrode 112, an electrolyte (not shown) impregnated in the positive electrode 114, the negative electrode 112, and the separator 113, a battery case 120, and a sealing member 140 that seals the battery case 120.

The lithium secondary battery 100 illustrated in FIG. 4 may include the positive electrode 114, the separator 113, and the negative electrode 112 that are sequentially layered, rolled into a spiral shape, and then enclosed in the battery case 140.

The positive electrode 114 may include a current collector and a positive active material layer formed on the current collector. A positive active material for forming the positive active material layer includes a lithium transition metal composite oxide core; and a coating layer including LiF on at least one portion of a surface of the lithium transition metal composite oxide core, in which an amount of Li-containing impurities that remain on a surface of the lithium transition metal composite oxide core may be 0.25 parts by weight or less based on 100 parts by weight of the lithium transition metal composite oxide core.

The positive active material includes the coating layer including LiF on at least one portion of the surface of the lithium transition metal composite oxide core to prevent a reaction such as an autolysis reaction of Li-containing impurities or electrolyte decomposition reaction, to thereby decrease the amount of gas generation such as $CO_2$. Also, the amount of Li-containing impurities that remain on the surface of the lithium transition metal composite oxide core may be 0.25 parts by weight or less based on 100 parts by weight of the lithium transition metal composite oxide core, and thus, the amount of gas generation may be decreased and high capacity may be maintained simultaneously, and thus the lithium secondary battery 100 including the positive active material has improved lifespan properties.

A lithium electrode may be used as the positive electrode 114.

The positive active material layer may further include a binder.

The binder thoroughly binds positive active material particles together and thoroughly binds the positive active material to the current collector. Examples of the binder include, but are not limited to polyamide imide, polyvinyl alcohol, carboxymethyl cellulose, hydroxyl propyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The current collector may be Al, but it is not limited thereto.

The positive electrode 114 may be prepared by mixing the positive active material and the binder (optionally, a conductor may be included) in a solvent to prepare a composition for forming a positive active material layer, and then coating the same on the current collector. The method of preparing the positive electrode 114 is widely known in the art, and thus, a detailed description thereof is omitted herein. The solvent may be N-methyl pyrrolidone or the like, but it is not limited thereto.

The positive active material layer may further include a conductor. The conductor may be at least one selected from the group consisting of carbon black, Ketjen black, acetylene black, synthetic graphite, natural graphite, copper powder, nickel powder, aluminum powder, silver powder, and polyphenylene, but it is not limited thereto.

Amounts of the binder and the conductor may be, for example, 2 parts by weight to about 5 parts by weight, respectively, based on 100 parts by weight of the positive active material, in which the amount of the solvent may be about 1 part by weight to about 10 parts by weight, based on 100 parts by weight of the positive active material. When the amounts of the binder, the conductor, and the solvent are included in the positive active material layer in the ranges described above, the positive active material layer may be formed easily.

The negative electrode 112 may include a current collector and a negative active material layer formed on the current collector. Examples of a negative active material for forming the negative active material layer include a lithium metal, a metal alloyable with lithium, a transition metal oxide, a material capable of doping and de-doping lithium, or a material that may reversibly intercalate and deintercalate lithium ions.

Non-limiting examples of the transition metal oxide include a tungsten oxide, a molybdenum oxide, a titanium oxide, a lithium titanium oxide, a vanadium oxide, and a lithium vanadium oxide.

Examples of the material capable of doping and de-doping lithium include Si, $SiO_x$ ($0<x\leq2$), a Si—Y alloy (wherein, Y is an alkali metal, an alkaline earth metal, an element from Groups 13 to 16, a transition metal, a rare earth element, or a combination element thereof, but is not Si), Sn, $SnO_2$, Sn—Y (wherein, Y is an alkali metal, an alkaline earth metal, an element from Groups 13 to 16, a transition metal, a rare earth element, or a combination element thereof, but not Sn) or at least one of these and $SiO_2$ may be mixed. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material that may reversibly intercalate and deintercalate lithium ions is a carbonaceous material, which may be any carbonaceous negative active material generally used in a lithium battery, and representative examples thereof include crystalline carbon, amorphous carbon, or a combination thereof. The crystalline carbon may be natural graphite or synthetic graphite having an amorphous form, a flat form, a flake form, a spherical form, or a fiber form, and the amorphous carbon may be soft carbon (low temperature calcined carbon), hard carbon, mesophase pitch carbide, and calcined coke.

The negative active material layer may further include a binder. The binder may be of the same type as the binder used in the positive electrode 114.

A negative electrode current collector may be Cu, but it is not limited thereto and examples thereof include stainless steel, aluminum, nickel, titanium, heat-treated carbon, copper or stainless steel surface treated with carbon, nickel, titanium, and silver, and aluminum-cadmium alloy. Also, as in the positive electrode current collector, minute irregularities may be formed on the surface thereof to enhance the binding strength of the negative active material, which may be used in various shapes such as a film, a sheet, a foil, a net, a porous body, a foaming body, and a non-woven body, etc.

The negative active material layer may optionally further include a conductor. The conductor may include a conductor of the same type as the conductor used in the positive electrode 114.

The negative electrode 112 may be prepared by mixing the negative active material and the binder (optionally, a conductor may be included) in a solvent to prepare a composition for forming a negative active material layer, and then coating the same on a current collector. The method of preparing the negative electrode 112 is widely known in the art, and thus, a detailed description thereof is omitted herein. The solvent may be N-methyl pyrrolidone or the like, but it is not limited thereto.

Amounts of the binder and the conductor may be, for example, 2 parts by weight to about 5 parts by weight, respectively, based on 100 parts by weight of the negative active material, in which the amount of the solvent may be about 1 part by weight to about 10 parts by weight, based on 100 parts by weight of the negative active material. When the amounts of the binder, the conductor, and the solvent are included in the negative active material layer in the ranges described above, the negative active material layer may be formed easily.

In some embodiments, a plasticizer may be further added to the composition for forming a positive active material layer and the composition for forming a negative active material layer to form holes in an electrode plate.

An electrolyte solution may include a non-aqueous organic solvent and a lithium salt.

The non-aqueous organic solvent may act as a medium through which ions that participate in an electrochemical reaction of a battery may move.

Examples of the non-aqueous organic solvent include a carbonate-based, an ester-based, an ether-based, a ketone-based, an alcohol-based solvent, and an aprotic solvent. Examples of the carbonate-based solvent include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), and butylene carbonate (BC). Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyl tetrahydrofuran, and tetrahydrofuran. Examples of the ketone-based solvent include cyclohexanone or the like. Examples of the alcohol-based solvent include ethyl alcohol and isopropyl alcohol. Examples of the aprotic solvent include nitriles such as R—CN (wherein R may be a C2 to C20 linear, branched, or ring-structured hydrocarbon group, which may include an aromatic ring having a double-bond, or an ether bond), amides such as dimethylformamide, dioxolanes such as 1,3-dioxolane, and sulfolanes.

The non-aqueous organic solvent may be used alone or as a mixture of at least two of the above, and when two or more of the above are mixed, a mixture ratio may be suitably adjusted depending on a desired battery performance.

The lithium salt may be dissolved in an organic solvent and acts as a supply source of lithium ions to enable a basic operation of a lithium battery. In addition, the lithium salt acts as a material that facilitates the movement of lithium ions between the positive electrode and the negative electrode. The lithium salt may include one or two from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, and $LiB(C_2O_4)_2$ (lithium bis(oxalato) borate; LiBOB) as a supporting electrolyte salt. A concentration of the lithium salt may be about 0.1 M to about 2.0 M. When the concentration of the lithium salt is within the range described above, the electrolyte solution may have suitable conductivity and viscosity, and thus, the electrolyte solution may have excellent properties and lithium ions may be moved effectively.

Depending on the type of the lithium secondary battery 100, a separator 113 may be disposed between the positive electrode 114 and the negative electrode 112. The separator 113 may be polyethylene, polypropylene, polyvinylidene fluoride, or a multi-layer film of two or more layers of the same. For example, a mixture multi-layer, such as a bi-layer separator having a structure of polyethylene/polypropylene, a tri-layer separator of polyethylene/polypropylene/polyethylene, and a tri-layer separator of polypropylene/polyethylene/polypropylene may be used.

Lithium batteries may be categorized into lithium ion batteries, lithium ion polymer batteries, and lithium polymer batteries, depending on the type of the separator and the electrolyte used, may be categorized into cylindrical lithium batteries, rectangular lithium batteries, coin-shaped lithium batteries, and pouch-shaped lithium batteries, according to the shape thereof, and may be categorized into bulk-type batteries and thin film type batteries depending on the size thereof. The shape of a lithium battery according to an embodiment is not particularly limited and a structure and a manufacturing method of the lithium battery is widely known in the art, and thus, a detailed description thereof is omitted.

Another embodiment relates to a method of preparing a positive active material including preparing a lithium transition metal composite oxide core; adding the lithium transition metal composite oxide core to a fluoride-based compound solution to obtain a co-precipitation compound; and heat-treating the co-precipitation compound to form a coating layer including LiF on at least one portion of a surface of the lithium transition metal composite oxide core.

As the method of preparing the positive active material, a lithium transition metal composite oxide core is prepared. The lithium transition metal composite oxide core may be prepared by a method widely known in the art, such as co-precipitation, sol-gel reaction, hydrothermal reaction, solid state reaction, and simple-combustion reaction. For example, co-precipitation or solid state reaction is used to prepare the lithium transition metal composite oxide.

Then, the lithium transition metal composite oxide core is added to a fluoride-based compound solution to prepare a co-precipitation compound.

The fluoride-based compound may be at least one of $NH_4F$, $NH_4HF_2$, HF, $CF_3COOH$, and anhydrous hydrogen fluoride, for example, $NH_4F$.

The fluoride-based compound solution may be water, ether, alcohol, or a combination thereof. The ether may be, for example, ethylene glycol or butylene glycol. The alcohol may be a C1-C4 alcohol, for example, methanol, ethanol, isopropanol, and butanol.

The concentration of the fluoride-based compound solution may be about 0.005 M to about 5 M. For example, the concentration of the fluoride-based compound solution may be about 0.01 M to about 5 M. When the fluoride-based compound solution having a concentration in the range above is used, $F^-$ included in the fluoride-based compound may react with lithium ions of $Li_2CO_3$ and LiOH that remain on a surface of the lithium transition metal composite oxide core to obtain co-precipitation compound. The co-precipitation compound and the lithium transition metal composite oxide core may form a highly dispersive fine powder. However, the highly dispersive fine powder may aggregate together, which increases an average diameter (D50) thereof, and thus, properties of the positive active material may deteriorate. As a result, there is a need to control the concentration and stirring speed of reactants to prevent deterioration.

After adding the fluoride-based compound solution to the lithium transition metal composite oxide core, a mixture obtained therefrom may be stirred at a constant speed of about 200 rpm to about 1000 rpm to react residual lithium on the surface thereof and the fluoride-based compound to obtain a co-precipitation compound.

Then, the co-precipitation compound may be heat-treated to form a coating layer including LiF on at least one portion of a surface of the lithium transition metal composite oxide core.

Formation of the coating layer including LiF on at least one portion of the surface of the lithium transition metal composite oxide core may include heat treatment in the air at a temperature of about 300° C. to about 800° C. for about 3 hours to about 8 hours. The heat treatment may increase the binding strength between the surface of the lithium transition metal composite oxide core and the coating layer.

Hereinafter, Examples and Comparative Examples of the present invention will be described. However, the Examples are for illustrative purposes only and the present invention is not limited to the Examples.

EXAMPLES

Preparation of a Positive Active Material

Example 1

A Positive Active Material Including a Coating Layer Coated with LiF on a Surface of a Lithium Transition Metal Composite Oxide Core $NiSO_4$, $CoSO_4$, and $MnSO_4$ were dissolved in distilled water at a molar ratio of 0.66 moles, 0.22 moles, and 0.12 moles, respectively, to prepare a 2.5 M $NiSO_4.xH_2O$ (x=6–7) solution, a 2.5 M $CoSO_4.xH_2O$ (x=7) solution, and a 2.5 M $MnSO_4.H_2O$ solution. In a reactor, the $NiSO_4.xH_2O$ (x=6–7) solution, the $CoSO_4.xH_2O$ (x=7) solution, and the $MnSO_4.H_2O$ solution were mixed to obtain a mixture solution. Then, in a constant temperature bath at a temperature of 45° C., a 6 M sodium hydroxide aqueous solution and a suitable amount of ammonia water were added to the mixture solution and then stirred at a speed of 600 rpm, and then stirred at pH 11.2 for 8 hours to obtain co-precipitation products. The co-precipitation products were washed and dried. The dried co-precipitation products were mixed with $Li_2CO_3$ at a molar ratio of 1:1, which was then heated in an air atmosphere at a heating rate of 3° C./min from a temperature of 800° C. to 1000° C., and then heat-treated at a temperature of 1000° C. for 10 hours to prepare a LiNi$_{0.66}$Co$_{0.22}$Mn$_{0.12}$O$_2$ core.

100 g of the LiNi$_{0.66}$Co$_{0.22}$Mn$_{0.12}$O$_2$ core was added to 0.1 L of a 0.5 M NH$_4$F aqueous solution and then stirred for 0.5 hours to precipitate all of unreacted products to obtain co-precipitation compounds.

The co-precipitation compounds were filtered and then dried at a temperature of 120° C. for 12 hours. Then, the dried co-precipitation compounds were heat-treated in an air atmosphere at a temperature of 500° C. to prepare a positive active material including a coating layer of LiF. In this regard, the amount of LiF was 0.11 parts by weight based on 100 parts by weight of the LiNi$_{0.66}$Co$_{0.22}$Mn$_{0.12}$O$_2$ core.

Example 2

A Positive Active Material Including a Coating Layer Coated with LiF on a Surface of a Lithium Transition Metal Composite Oxide Core NiSO$_4$, CoSO$_4$, and MnSO$_4$ were dissolved in distilled water at a molar ratio of 0.66 moles, 0.22 moles, and 0.12 moles, respectively, to prepare a 2.5 M NiSO$_4$.xH$_2$O (x=6-7) solution, a 2.5 M CoSO$_4$.xH$_2$O (x=7) solution, and a 2.5 M MnSO$_4$.H$_2$O solution. In a reactor, the NiSO$_4$.xH$_2$O (x=6-7) solution, the CoSO$_4$.xH$_2$O (x=7) solution, and the MnSO$_4$.H$_2$O solution were mixed to obtain a mixture solution. Then, in a constant temperature bath at a temperature of 45° C., a 6 M sodium hydroxide aqueous solution and a suitable amount of ammonia water were added to the mixture solution and then stirred at a speed of 600 rpm, and then stirred at pH 11.2 for 8 hours to obtain co-precipitation products. The co-precipitation products were washed and dried. The dried co-precipitation products were mixed with Li$_2$CO$_3$ at a molar ratio of 1:1, which was then heated in an air atmosphere at a heating rate of 3° C./min from a temperature of 800° C. to 1000° C., and then heat-treated at a temperature of 1000° C. for 10 hours to prepare a LiNi$_{0.66}$Co$_{0.22}$Mn$_{0.12}$O$_2$ core.

100 g of the LiNi$_{0.66}$Co$_{0.22}$Mn$_{0.12}$O$_2$ core was added to 0.1 L of a 1.0 M NH$_4$F aqueous solution and then stirred for 0.5 hours to precipitate all of unreacted products to obtain co-precipitation compounds.

The co-precipitation compounds were filtered and then dried at a temperature of 120° C. for 12 hours. Then, the dried co-precipitation compounds were heat-treated in air at a temperature of 500° C. to prepare a positive active material including a coating layer of LiF. In this regard, the amount of LiF was 0.13 parts by weight based on 100 parts by weight of the LiNi$_{0.66}$Co$_{0.22}$Mn$_{0.12}$O$_2$ core.

Example 3

A Positive Active Material Including a Coating Layer Coated with LiF on a Surface of a Lithium Transition Metal Composite Oxide Core NiSO$_4$, CoSO$_4$, and MnSO$_4$ were dissolved in distilled water at a molar ratio of 0.66 moles, 0.22 moles, and 0.12 moles, respectively, to prepare a 2.5 M NiSO$_4$.xH$_2$O (x=6-7) solution, a 2.5 M CoSO$_4$.xH$_2$O (x=7) solution, and a 2.5 M MnSO$_4$.H$_2$O solution. In a reactor, the NiSO$_4$.xH$_2$O (x=6-7) solution, the CoSO$_4$.xH$_2$O (x=7) solution, and the MnSO$_4$.H$_2$O solution were mixed to obtain a mixture solution. Then, in a constant temperature bath at a temperature of 45° C., a 6 M sodium hydroxide aqueous solution and a suitable amount of ammonia water were added to the mixture solution and then stirred at a speed of 600 rpm, and then stirred at pH 11.2 for 8 hours to obtain co-precipitation products. The co-precipitation products were washed and dried. The dried co-precipitation products were mixed with Li$_2$CO$_3$ at a molar ratio of 1:1, which was then heated in an air atmosphere at a heating rate of 3° C./min from a temperature of 800° C. to 1000° C., and then heat-treated at a temperature of 1000° C. for 10 hours to prepare a LiNi$_{0.66}$Co$_{0.22}$Mn$_{0.12}$O$_2$ core.

100 g of the LiNi$_{0.66}$Co$_{0.22}$Mn$_{0.12}$O$_2$ core was added to 0.1 L of a 2.0 M NH$_4$F aqueous solution and then stirred for 0.5 hours to precipitate all of unreacted products to obtain co-precipitation compounds.

The co-precipitation compounds were filtered and then dried at a temperature of 120° C. for 12 hours. Then, the dried co-precipitation compounds were heat-treated in air at a temperature of 500° C. to prepare a positive active material including a coating layer of LiF. In this regard, the amount of LiF was 0.15 parts by weight based on 100 parts by weight of the LiNi$_{0.66}$Co$_{0.22}$Mn$_{0.12}$O$_2$ core.

Example 4

A Positive Active Material Including a Coating Layer Coated with LiF on a Surface of a Lithium Transition Metal Composite Oxide Core NiSO$_4$, CoSO$_4$, and MnSO$_4$ were dissolved in distilled water at a molar ratio of 0.66 moles, 0.22 moles, and 0.12 moles, respectively, to prepare a 2.5 M NiSO$_4$.xH$_2$O (x=6-7) solution, a 2.5 M CoSO$_4$.xH$_2$O (x=7) solution, and a 2.5 M MnSO$_4$.H$_2$O solution. In a reactor, the NiSO$_4$.xH$_2$O (x=6-7) solution, the CoSO$_4$.xH$_2$O (x=7) solution, and the MnSO$_4$.H$_2$O solution were mixed to obtain a mixture solution. Then, in a constant temperature bath at a temperature of 45° C., a 6 M sodium hydroxide aqueous solution and a suitable amount of ammonia water were added to the mixture solution and then stirred at a speed of 600 rpm, and then stirred at pH 11.2 for 8 hours to obtain co-precipitation products. The co-precipitation products were washed and dried. The dried co-precipitation products were mixed with Li$_2$CO$_3$ at a molar ratio of 1:1, which was then heated in an air atmosphere at a heating rate of 3° C./min from a temperature of 800° C. to 1000° C., and then heat-treated at a temperature of 1000° C. for 10 hours to prepare a LiNi$_{0.66}$Co$_{0.22}$Mn$_{0.12}$O$_2$ core.

100 g of the LiNi$_{0.66}$Co$_{0.22}$Mn$_{0.12}$O$_2$ core was added to 0.1 L of a 0.25 M NH$_4$F aqueous solution and then stirred for 0.5 hours to precipitate all of unreacted products to obtain co-precipitation compounds.

The co-precipitation compounds were filtered and then dried at a temperature of 120° C. for 12 hours. Then, the dried co-precipitation compounds were heat-treated in air at a temperature of 500° C. to prepare a positive active material including a coating layer of LiF. In this regard, the amount of LiF was 0.05 parts by weight based on 100 parts by weight of the LiNi$_{0.66}$Co$_{0.22}$Mn$_{0.12}$O$_2$ core.

Comparative Example 1

A Positive Active Material that Only Includes a Lithium Transition Metal Composite Oxide Core NiSO$_4$, CoSO$_4$, and MnSO$_4$ were dissolved in distilled water at a molar ratio of 0.66 moles, 0.22 moles, and 0.12 moles, respectively, to prepare a 2.5 M NiSO$_4$.xH$_2$O (x=6-

7) solution, a 2.5 M $CoSO_4 \cdot xH_2O$ (x=7) solution, and a 2.5 M $MnSO_4 \cdot H_2O$ solution. In a reactor, the $NiSO_4 \cdot xH_2O$ (x=6–7) solution, the $CoSO_4 \cdot xH_2O$ (x=7) solution, and the $MnSO_4 \cdot H_2O$ solution were mixed to obtain a mixture solution. Then, in a constant temperature bath at a temperature of 45° C., a 6 M sodium hydroxide aqueous solution and a suitable amount of ammonia water were added to the mixture solution and then stirred at a speed of 600 rpm, and then stirred at pH 11.2 for 8 hours to obtain co-precipitation products. The co-precipitation products were washed and dried. The dried co-precipitation products were mixed with $Li_2CO_3$ at a molar ratio of 1:1, which was then heated in an air atmosphere at a heating rate of 3° C./min from a temperature of 800° C. to 1000° C., and then heat-treated at a temperature of 1000° C. for 10 hours to prepare a positive active material of $LiNi_{0.66}Co_{0.22}Mn_{0.12}O_2$.

Comparative Example 2

A Positive Active Material Including a Coating Layer Coated with $AlF_3$ on a Surface of a Lithium Transition Metal Composite Oxide Core In a reactor, 100 mL of a 2M $Al(NO_3)_3 \cdot 9H_2O$ aqueous solution was prepared. A temperature of the aqueous solution was maintained at 80° C., stirred at a speed of 200 rpm, and 100 mL of a 6M $NH_4F$ aqueous solution was added to the reactor at a rate of 10 ml/min to prepare a mixture. Then, the mixture was stirred for 0.5 hours to precipitate all of the unreacted products to obtain co-precipitation compounds. The co-precipitation compounds were filtered and then dried at a temperature of 120° C. for 12 hours. The dried co-precipitation compounds were heat-treated in an air atmosphere at a temperature of 500° C. to prepare a positive active material including a coating layer coated with $AlF_3$. In this regard, an amount of the $AlF_3$ was 0.018 parts by weight based on 100 parts by weight of a $LiNi_{0.66}Co_{0.22}Mn_{0.12}O_2$ core.

Manufacturing a Lithium Secondary Battery

Example 5

The positive active material of Example 1, polyvinylidene fluoride, and Ketjen black powder as a conductor were mixed at a ratio of 92:4:4 in N-methyl pyrrolidone to prepare a positive active material slurry. The positive active material slurry was coated on an aluminum foil having a thickness of 12 µm by using doctor blade method and then dried to manufacture a positive electrode plate, which was further vacuum dried to manufacture a coin type half cell having a diameter of about 14 mm.

When manufacturing a cell, lithium metal was used as a counter electrode, a microporous polypropylene separator was used as a separator (Celgard 3501), and 1.3M $LiPF_6$ dissolved in a mixture solution of ethylene carbonate:diethylene carbonate (EC:DEC) (at a volume ratio of 3:7) was used as an electrolyte.

Examples 6 to 8

A coin type half cell was manufactured in the same manner as in Example 5, except that the positive active materials of Examples 2 to 4 were used instead of the positive active material of Example 1.

Comparative Examples 3 and 4

A coin type half cell was manufactured in the same manner as in Example 5, except that the positive active materials of Comparative Examples 1 and 2 were used instead of the positive active material of Example 1.

Analysis of a Surface of a Positive Active Material

Analysis Example 1

SEM Image

Figure 1:
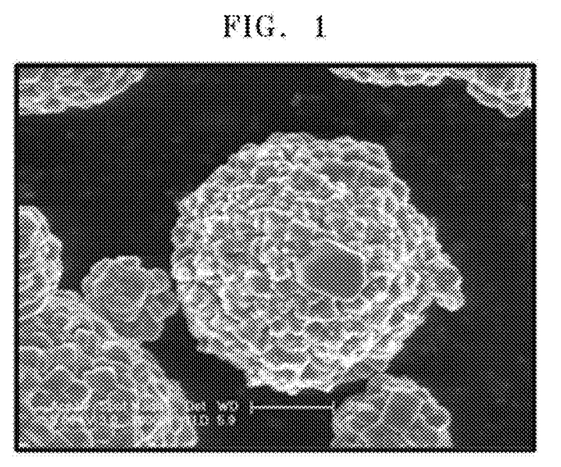
FIG. 1 is a scanning electron microscope (SEM) image of the positive active material prepared in Example 1, including a LiF coating layer on a surface of a lithium transition metal composite oxide core.
Figure 2:
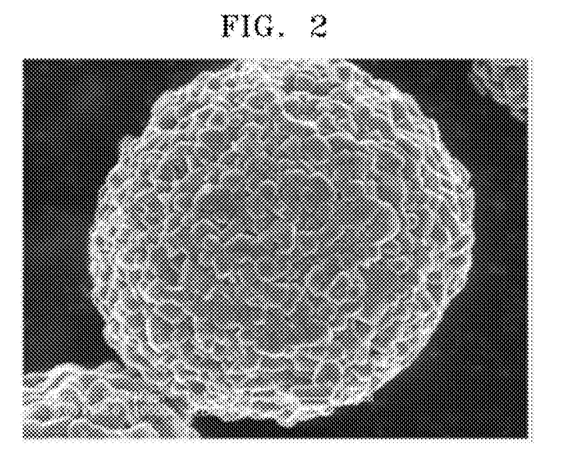
FIG. 2 is an SEM image of the positive active material prepared in Comparative Example 1 that only includes a lithium transition metal composite oxide core.
Figure 3:
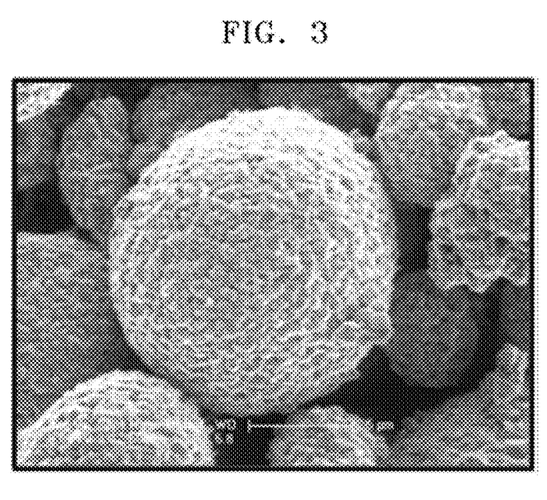
FIG. 3 is an SEM image of the positive active material prepared in Comparative Example 2 including an AlF3 coating layer on a surface of a lithium transition metal composite oxide core.

Surfaces of the positive active materials prepared in Example 1 and Comparative Examples 1 and 2 were analyzed by using a scanning electron microscope (SEM, Sirion200, a product of FEI), and the results obtained therefrom are shown in FIGS. 1 to 3.

Referring to FIG. 1, which is an SEM image of the positive active material prepared in Example 1, it may be concluded that a coating layer having LiF particles scattered on a surface of a lithium transition metal composite oxide core is formed.

Referring to FIGS. 2 and 3, the surfaces of the lithium transition metal composite oxide core and the $AlF_3$ coating layer are relatively smooth surfaces.

Analysis Example 2

XPS Analysis

A surface having an area of about 0.2 $mm^2$ of the positive active material prepared in Example 1 was subjected to a single color Al—Kα X-ray (1486.9 eV) XPS analysis by using Thermo Electron Corporation ESCA Lab 250 while maintaining a chamber pressure of $8 \times 10^{-10}$ mbar. The results obtained therefrom are shown in FIG. 5.

Figure 5:
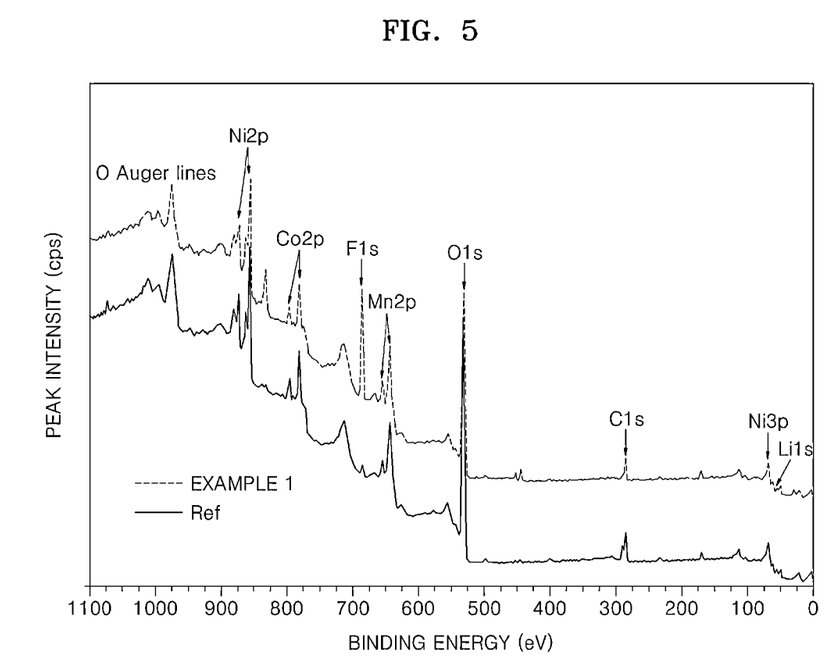
FIG. 5 is an XPS graph of a surface of the positive active material prepared in Example 1.

Referring to FIG. 5, it may be concluded that an F1s peak was formed at a binding energy of about 685.1 eV, and thus, that a coating layer having LiF was formed on a surface of the positive active material prepared in Example 1.

Analysis Example 3

Analysis of an Amount of Li-Containing Impurities that Remain on a Surface of a Lithium Transition Metal Composite Oxide Core 30 g of the positive active materials prepared in Examples 1 to 3 and Comparative Examples 1 and 2 and 100 g of distilled water was added to a container including a magnetic bar therein, and then stirred for 30 minutes to prepare a solution. While adding a 0.1 N HCl solution to the solution prepared above, pH titration was performed until the pH reached 3 or less and a flow rate was adjusted such that the titration took about 20 minutes to about 30 minutes.

In this regard, the positive active materials prepared in Examples 1 to 3 and Comparative Examples 1 and 2 were used to measure the amounts of Li-containing impurities, e.g., $Li_2CO_3$ and LiOH that remain on a surface of a $LiNi_{0.66}Co_{0.22}Mn_{0.12}O_2$ core. The results obtained therefrom are shown in Table 1 below.

TABLE 1

|  | Amount of $Li_2CO_3$ based on 100 parts by weight of $LiNi_{0.66}Co_{0.22}Mn_{0.12}O_2$ core (parts by weight) | Amount of LiOH based on 100 parts by weight of $LiNi_{0.66}Co_{0.22}Mn_{0.12}O_2$ core (parts by weight) |
| --- | --- | --- |
| Example 1 | 0.18 | 0.07 |

TABLE 1-continued

| | Amount of $Li_2CO_3$ based on 100 parts by weight of $LiNi_{0.66}Co_{0.22}Mn_{0.12}O_2$ core (parts by weight) | Amount of LiOH based on 100 parts by weight of $LiNi_{0.66}Co_{0.22}Mn_{0.12}O_2$ core (parts by weight) |
|---|---|---|
| Example 2 | 0.16 | 0.06 |
| Example 3 | 0.14 | 0.05 |
| Comparative Example 1 | 0.24 | 0.16 |
| Comparative Example 2 | 0.27 | <0.0000001 |

As shown in Table 1 above, it may be concluded that the amount of Li-containing impurities that remain on a surface of the $LiNi_{0.66}Co_{0.22}Mn_{0.12}O_2$ core included in the positive active materials prepared in Examples 1 to 3 are 0.25 parts by weight, 0.22 parts by weight, and 0.19 parts by weight, based on 100 parts by weight of the $LiNi_{0.66}Co_{0.22}Mn_{0.12}O_2$ core.

Thus, the amount of the Li-containing impurities that remain on the surface of the $LiNi_{0.66}Co_{0.22}Mn_{0.12}O_2$ core included in the positive active materials prepared in Examples 1 to 3 may be lower than the amount of Li-containing impurities that remain on the surface of the $LiNi_{0.66}Co_{0.22}Mn_{0.12}O_2$ core included in the positive active materials prepared in Comparative Examples 1 and 2.

Also, the amount of Li-containing impurities that remain on the surface of the $LiNi_{0.66}Co_{0.22}Mn_{0.12}O_2$ core that remain on the surface of the positive active materials prepared in Examples 1 to 3 is 0.25 parts by weight or less based on 100 parts by weight of the $LiNi_{0.66}Co_{0.22}Mn_{0.12}O_2$ core.

Performance Evaluation of a Lithium Secondary Battery

Evaluation Example 1

Evaluation of Lifespan Properties

A coin type full cell, including an assembly of two coin type half cells manufactured in Example 5 and Comparative Examples 3 and 4, was subjected to a formation charge and discharge process. During the formation process, the lithium secondary battery was charged at 0.1 C until 4.3 V was reached. Then the lithium secondary battery was discharged at a constant current at 0.1 C until 3.0 V was reached.

Thereafter, the lithium secondary battery was charged at 1 C in the manner described above and then discharged until 3.0 V was reached to measure discharge capacity. The charge and discharge process was repeated to evaluate lifespan properties.

Figure 6:
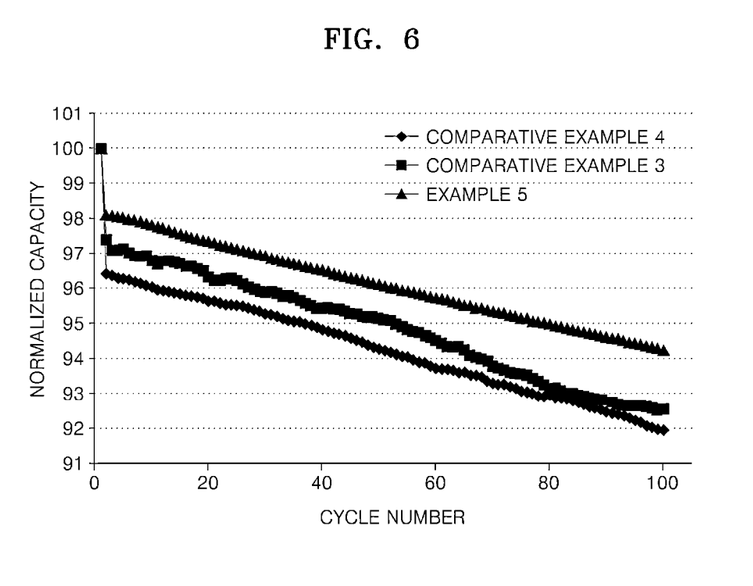
FIG. 6 is a graph showing lifespan properties of the lithium secondary batteries prepared in Example 5 and Comparative Examples 3 and 4.

A discharge capacity in each cycle and a discharge capacity at a $100^{th}$ cycle of the lithium secondary battery were measured. The results obtained therefrom are shown in FIG. 6 and Table 2 below.

From the measurement results, a 'normalized capacity', e.g., a 'capacity retention rate' was calculated. The capacity retention rate (%) may be calculated according to Equation 1 below.

Capacity retention rate(%)=discharge capacity at $100^{th}$ cycle/discharge capacity at $1^{st}$ cycle  [Equation 1]

TABLE 2

| | Discharge capacity at $1^{st}$ cycle (mAh) | Discharge capacity at $100^{th}$ cycle (mAh) | Capacity retention rate (%) |
|---|---|---|---|
| Example 5 | 170 | 160.26 | 94.27 |
| Comparative Example 3 | 176 | 161.88 | 91.98 |
| Comparative Example 4 | 171 | 158.29 | 92.57 |

Referring to FIG. 6 and Table 2, a coin type full cell, including an assembly of two coin type half cells manufactured in Example 5, showed more improvement in capacity retention rate than a coin type full cell, including an assembly of two coin type half cells manufactured in Comparative Examples 3 and 4. From these results, it may be concluded that lifespan properties of the lithium secondary battery manufactured in Example 5 are better than those of the lithium secondary batteries manufactured in Comparative Examples 3 and 4.

As described above, according to the one or more of the above embodiments, provided is a positive active material including a lithium transition metal composite oxide core; and a coating layer including LiF on at least one portion of a surface of the lithium transition metal composite oxide core, in which an amount of Li-containing impurities that remain on the surface of the lithium transition metal composite oxide core is 0.25 parts by weight or less based on 100 parts by weight of the lithium transition metal composite oxide core and a method of preparing the positive active material may provide a positive electrode for a lithium secondary battery that has a decreased amount of Li-containing impurities that remain on the surface of the lithium transition metal composite oxide to decrease an amount of gas generation and has improved lifespan properties, and a lithium secondary battery including the positive electrode.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims.

What is claimed is:
1. A positive active material comprising:
a lithium transition metal composite oxide core; and
a coating layer comprising LiF in an amount of about 0.001 parts by weight to about 0.2 parts by weight based on 100 parts by weight of the lithium transition metal composite oxide core on at least one portion of a surface of the lithium transition metal composite oxide core,
wherein the amount of Li-containing impurities that remain on a surface of a lithium transition metal composite oxide core is 0.25 parts by weight or less based on 100 parts by weight of the lithium transition metal composite oxide core.
2. The positive active material of claim 1, wherein the Li-containing impurities comprise lithium carbonate ($Li_2CO_3$) and lithium hydroxide (LiOH).

3. The positive active material of claim 1, wherein the coating layer comprises the surface of the lithium transition metal composite oxide core surface treated with at least one of $NH_4F$, $NH_4HF_2$, HF, $CF_3COOH$, and anhydrous hydrogen fluoride.

4. The positive active material of claim 1, wherein the coating layer has LiF particles scattered on the surface of the lithium transition metal composite oxide core.

5. The positive active material of claim 1, wherein the amount of the LiF is about 0.05 parts by weight to about 0.2 parts by weight, based on 100 parts by weight of the lithium transition metal composite oxide core.

6. The positive active material of claim 1, wherein the thickness of the coating layer is from about 10 nm to about 500 nm.

7. The positive active material of claim 1, wherein an amount of nickel with respect to a total amount of transition metals comprised in the lithium transition metal composite oxide core is 40 wt % or greater.

8. The positive active material of claim 1, wherein the lithium transition metal composite oxide core is a lithium transition metal composite oxide represented by Formula 1 below:

$$Li_a Ni_b (M1)_c (M2)_d O_2 \qquad <\text{Formula 1}>$$

in Formula 1,
0.9<a≤1.1, 0.5≤b<0.9, 0.1≤c<0.45, and 0≤d<0.15, 0.1≤c+d<0.6, M1 is at least one of Co and Mn, and M2 is at least one of Al, Ti, Mg, Sc, V, Cr, Fe, Co, Mn, Zn, B, Si, Ga, Ge, N, P, As, Zr, Mo, W, Ru, Rh, Pt, Ag, and Sn.

9. The positive active material of claim 1, wherein the lithium transition metal composite oxide core is a secondary particle in which a plurality of primary particles are aggregated.

10. The positive active material of claim 9, wherein an average diameter (D50) of the secondary particle is about 3 μm to about 20 μm.

11. A positive electrode for a lithium secondary battery comprising the positive active material according to claim 1.

12. A lithium secondary battery comprising:
a negative electrode;
a positive electrode comprising:
a lithium transition metal composite oxide core;
a coating layer comprising LiF in an amount of about 0.001 parts by weight to about 0.2 parts by weight based on 100 parts by weight of the lithium transition metal composite oxide core on at least one portion of a surface of the lithium transition metal composite oxide core, and
wherein the amount of Li-containing impurities that remain on a surface of a lithium transition metal composite oxide core is 0.25 parts by weight or less based on 100 parts by weight of the lithium transition metal composite oxide core.

13. The lithium secondary battery of claim 12, wherein the Li-containing impurities comprise lithium carbonate ($Li_2CO_3$) and lithium hydroxide (LiOH).

14. The lithium secondary battery of claim 12, wherein the coating layer comprises the surface of the lithium transition metal composite oxide core surface treated with at least one of $NH_4F$, $NH_4HF_2$, HF, $CF_3COOH$, and anhydrous hydrogen fluoride.

15. The lithium secondary battery of claim 12, wherein the coating layer has LiF particles scattered on the surface of the lithium transition metal composite oxide core.

* * * * *